Figure 1:
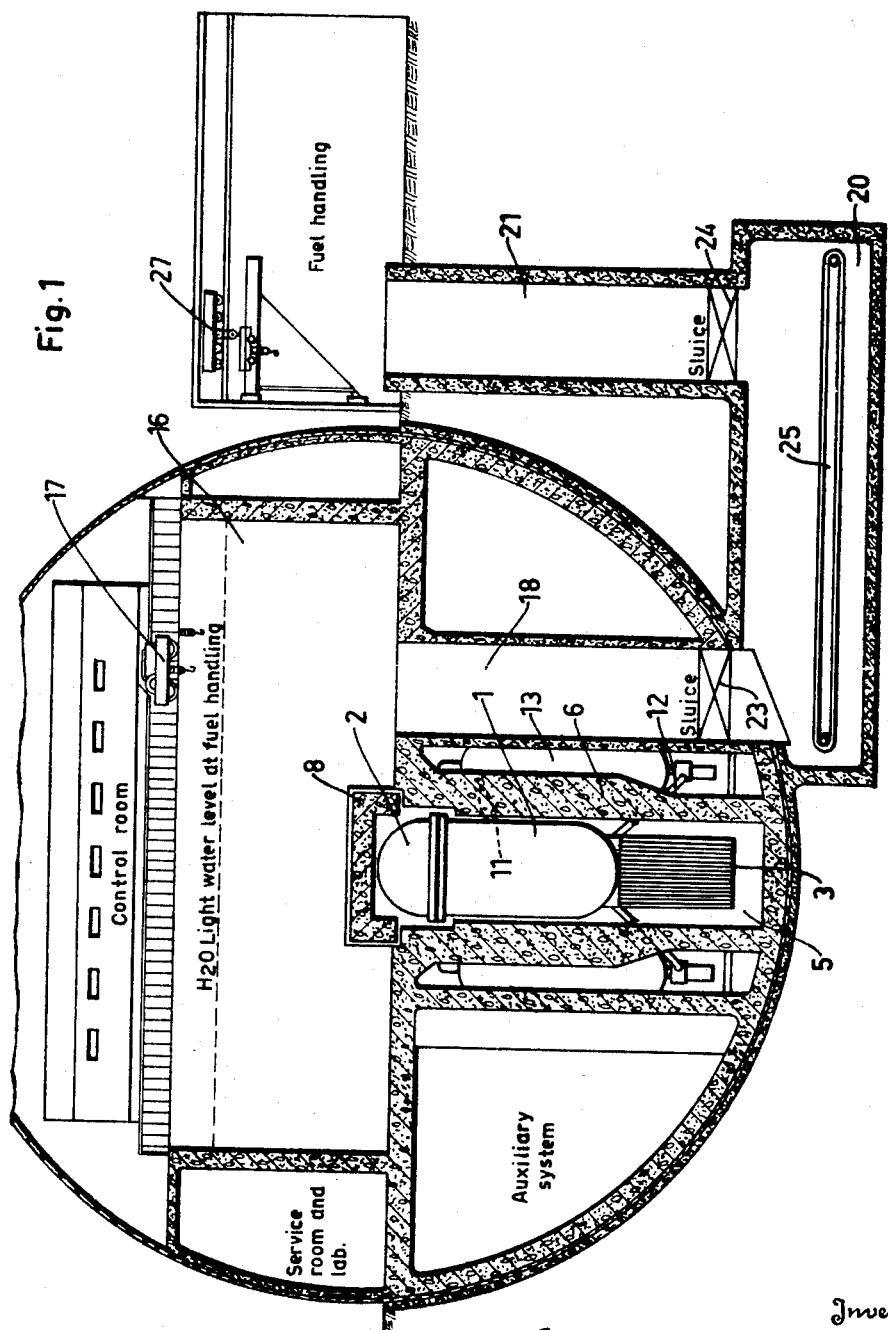

Aug. 4, 1964    B. T. A. HARGÖ ETAL    3,143,479
CORE HANDLING IN HEAVY WATER REACTORS
Filed Dec. 2, 1960    3 Sheets-Sheet 1

Inventors.
Bernt Torsten Allan Hargö
Anton Ingvar Holtz
By Pierce, Scheffler & Parker
Attorneys

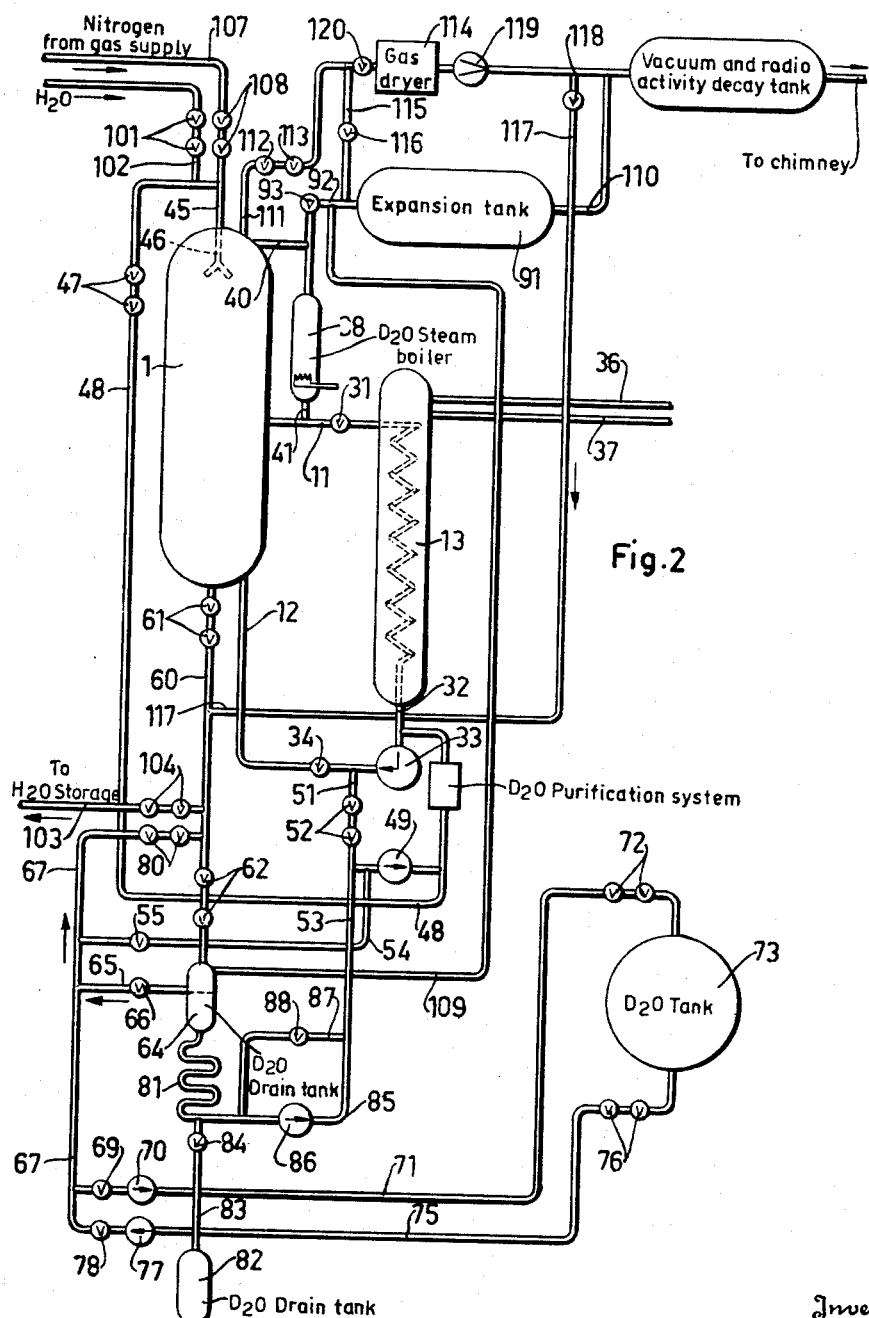

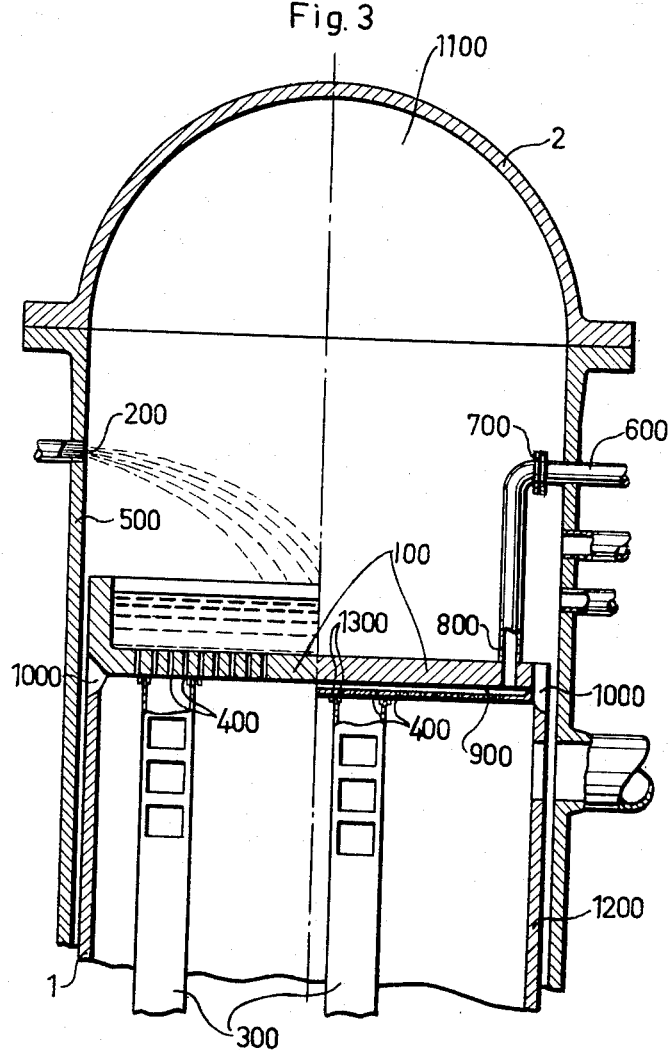

United States Patent Office 3,143,479
Patented Aug. 4, 1964

3,143,479
CORE HANDLING IN HEAVY WATER REACTORS
Bernt Torsten Allan Hargö, Solna, and Anton Ingvar Holtz, Vallingby, Sweden, assignors to Aktiebolaget Atomenergi, Stockholm, Sweden, a company of Sweden
Filed Dec. 2, 1960, Ser. No. 73,260
Claims priority, application Sweden Dec. 7, 1959
3 Claims. (Cl. 176—30)

The invention relates to an arrangement and a process for core handling in a heavy water reactor. Whether heavy or light water is used as coolant and/or moderator in a nuclear reactor, the fuel elements sooner or later must be taken out for exchange, repair or rearrangement. In light water reactors core handling is comparatively easy to carry out. Thus it is known to arrange a system of channels in connection with a light water reactor and to fill the channel system with light water to such a level, that under cover of the water with cranes and traversers the reactor lid may be lifted off and then the entire core or parts of it may be lifted out and exchanged. Due to the extreme high cost of the heavy water it is out of the question to fill the entire channel system with heavy water, this relatively simple exchange method accordingly has not been considered eligible for heavy water reactors. For these instead it has been necessary to use costly and complicated arrangements with complicated remote control means and excessively heavy loading facilities due to the dimensions of shielding, and this has been pointed out to be a considerable disadvantage of heavy water reactors.

The object of the present invention is to provide means for core handling in heavy water reactors with substantially as simple arrangements as in the light water reactors referred to above.

According to the present invention the core or parts of it is removed for fuel exchange, maintenance etc. and a partly or fully new core or the old core after repair or service is restored in a way known per se, and this will be outlined in conjunction with the description of an example hereinbelow. This procedure and the facilities for its performance are not included in the present invention.

The term "core" as employed in the present description and claims is meant to comprise the entire core as well as parts of it, individual fuel elements or construction parts, for example.

Before said removal of the core may be carried out, however, it is necessary to withdraw as much as possible of the precious heavy water and to replace it by light water. This gives rise to problems due to the fact that the losses of heavy water must be limited, already 1% losses as waste or as mixtures with a large amount of light water is serious from an economic point of view.

Another serious problem is caused by the decay heat, since due to this if the cooling is interrupted only for a short interval of time the temperature in the fuel elements may rise to a prohibited degree.

According to the present invention these two problems have been solved highly satisfactorily in carrying out an exchange of the core in the following stages:

(1) Drawing-off the heavy water from the core and confining it in a container after that the reactor has been shut down, while heavy water is sprayed over the fuel elements;

(2) Spraying light water over the fuel elements washing out the rest of the heavy water, a limited volume of the mixture of heavy water and light water thus obtained being collected and confined in a container;

(3) Filling the reactor with light water to a predetermined level after which the core is moved out of and a new core is moved into the reactor in the way used in light water reactors;

(4) Then drawing-off the light water from the core after that the reactor has been closed while light water is sprayed over the fuel elements;

(5) Spraying heavy water over the fuel elements washing out the rest of the light water, a limited volume of the mixture of light water and heavy water thus obtained being collected and confined in a container;

(6) And finely filling the reactor with heavy water to a predetermined level, after which the reactor is ready for a new running period.

In light water reactors the transport of the core from and to the reactor is usually carried out in a way which will now be outlined in conjunction with FIG. 1 of the accompanying drawings.

Thus FIG. 1 illustrates a reactor and a channel system known per se enclosed to said reactor.

The reactor 1, which in the embodiment illustrated has a cupola-shaped lid 2 and conventional control rods 3, is enclosed within a pit 5 wtih radiation shield of concrete 6. The pit has a top concrete shield in the shape of a cupola or cap 8. The reactor is by pipes 11 and 12 connected with heat exchangers 13 situated outside the concrete 6. On a level above the reactor there is a basin 16 which is a part of the light water channel system. The basin has a sufficient depth to be filled to such a water-level that the water constitutes a sufficient shield. Above the basin there is a traverser 17 and at the bottom of the basin there is a shaft 18, through which the fuel elements, which are lifted by the traverser 17 out of the reactor may be descended down to the bottom channel 20. This is by another shaft 21 in communication with the surroundings outside the reactor plant. At the bottom of the shaft 18 there is a sluice or closing device 23 and at the bottom of the shaft 21 there is a similar sluice 24, and in the bottom channel 20 there is a conveyor 25. Above the shaft 21 there is a traverser 27.

On changing the core the sluice 24 is being closed and the channel system is filled with ordinary water up to a certain level. When the top shield 8 has been moved away and the lid 2 lifted off, the core is lifted with the aid of the traverser 17 out of the reactor 1. The core or parts of it is then moved on a sufficient depth under the water surface in the basin to the shaft 18, through which it is descended to the conveyor 25. The sluice 23 is then closed and the fuel elements are moved to shaft 21 and are lifted with the aid of the traverser 27 through this shaft, after the sluice 24 has been opened.

At the restoration of the core this is lowered through the shaft 21 and the open sluice 24, which is then closed and sluice 23 opened while the core is moved through channel 20, after which it is lifted through sluice 23 and shaft 18 and then removed further into its space in the reactor 1.

When the lid 2 and the concrete shield 8 have been replaced the reactor is ready for a new working cycle.

As has been mentioned above, however, this procedure may be used in heavy water reactors only if the heavy water at first has been replaced by light water, which is a difficult problem, especially since the heavy water in an adequate manner must be stored during the core handling period and the material may be damaged by the so called decay heat, if this is not kept under control.

Referring now to FIG. 2 it shall be more closely described, how to carry out the invention in a special case. The reactor 1 having a total capacity of 150 cubic meters, for example, is assumed to contain some 80 cubic meters of heavy water reaching well above the fuel elements in the core. By a pipe 11 in which there is a valve 31 the reactor is in communication with the heat exchanger 13, from which a pipe 32 leads to a circulation pump 33, which through the pipe 12, containing a valve 34, pumps the heavy water issuing from the heat exchanger back into the reactor 1. On the secondary side the heat exchanger 13 is connected with energy transforming apparatus. For the maintenance of the pressure in the steam chamber above the heavy water in the reactor a steam boiler 38, which suitably is driven electrically, is connected with the top part of the reactor by a pipe 40. The boiler 38 suitably receives its heavy water by pipe 41 from the connection pipe 11 between the reactor and the heat exchanger. A pipe 45 is ending in the steam chamber of the reactor, suitably with a spraying device 46. During normal operation the pressure and temperature conditions in the reactor may be controlled to a certain degree by pumping relatively cold heavy water through pipe 45, which at that occasion is connected with pipe 48 via twin valves 47, pipe 48 being supplied with heavy water by pump 49, which in turn receive heavy water either from pipe 12 between the heat exchanger 13 and the reactor through pipe 51 and the twin valve 52 or through pipe 53 from a circulation pump which will be more closely described hereinbelow or finally through pipe 54 from a storage tank for heavy water which will also be more closely described.

At the bottom of the reactor the heavy water space is connected with a pipe 60 via the twin valve 61. Through this pipe the heavy water may be drawn off from the reactor via the twin valve 62 to a circulation tank 64, which is connected with the storage tank 73 via an overflow pipe 65, provided with a valve 66, and through a pipe 67, valve 69, the pump 70 and the pipe 71 with the twin valve 72. For transportation to the reactor tank 73 is here connected with pipe 67 also via pipe 75 with twin valve 76, pump 77 and valve 78. Pipe 67 is connected with said pipe 60 at the bottom end of the reactor via twin valve 80. Through these pipes and pumps the heavy water thus may be discharged into the storage tank 73 and brought back from there to the reactor.

At the bottom of the circulation tank 64 there is a discharge connected with a cooler 81, the base part of which being connected with a drain tank 82 via a pipe 83 with a valve 84. The cooler 81 is also connected with said pipe 53 and said pump 49, either via pipe 85 with the pump 86 or via a shunt pipe 87 with valve 88.

The steam space of the reactor may be connected with an expansion tank 91 via pipes 111 and 115 with the valves 112, 113 and 116 respectively, the boiler 38 may also be connected with said expansion tank 91 via pipe 92 provided with safety valve 93.

In the embodiment illustrated the light water is supplied to the reactor through pipe 45 from a pipe 102 provided with a twin valve 101. A discharge for light water is arranged from the bottom pipe 60 through pipe 103 with twin valve 104.

Also the gas or steam which is to be used for the gas drying may be supplied through pipe 45 from a pipe 107 with twin valve 108. When heavy water is flushed out by gas this is suitably blown through the circulation tank 64 in which liquid is separated, continuing through pipe 109 to the expansion tank 91 and further through pipe 110 to a chimney for example. When gas is used for removing light water it may suitably escape through the bottom pipe 60 and the water discharge pipe 103.

The last remainder of light water may also be carried out by drying with gas, whereat the flushing gas remaining may be used. As a matter of course new gas may be added continuously through pipe 45 for example. At drying the gas is circulated from the top of the reactor through pipe 111 with valves 112 and 113 to fan and dryer 114 back to the reactor through pipe 117 with valve 118, pipe 117 issuing in pipe 60.

On core exchange the procedure is substantially as follows and it is appreciated that there are the more possibilities of modification the lower is the decay heat.

The reactor is shut down by inserting the control rods 3 (FIG. 1) into the core. The temperature of the reactor is going down because the circulation pumps 33 are allowed to continue to pump and the heat exchangers 13 are cooled on the secondary side. The pressure maintaining space of the reactor, i.e. the top part thereof, is being connected with the expansion tank 91, the gases and the vapours at first flowing over to the expansion tank and at a lower temperature in the reactor the top part of it is filled by gas from the expansion system. During this period of time the sluice 23 in the shaft 18 is opened and sluice 24 in the shaft 21 is closed, whereupon the channel system is being filled with light water. When the temperature in the reactor has dropped to about 50° C. pump 33 is stopped and drain pipes are opened, i.e. valves 61, 62, 66, 69 and 72 are opened and the heavy water is pumped by pump 70 to the store tank 73 via circulation tank 64, which is thereby filled. Valve 52 is closed. Pump 49 which normally supplies heavy water from pipe 51 through pipe 48 to pipe 45 for pressure control, now circulates heavy water from the circulation tank 64 through pipe 53 and through pipe 48 to the spray 46 through pipe 45. For it is necessary to provide effective cooling during the discharge period since otherwise the decay heat of the fuel elements would give rise to too high a temperature in the reactor. For this reason the water coming from the circulation tank 64 is also cooled in a cooler 81. When pump 70 is sucking gas from circulation tank 64, which is an indication of the fact that the system above tank 64 is substantially emptied in regard to heavy water and that the reactor has been filled with gas from the expansion tank 91, the primary heavy water store is enclosed beyond double valves. The spray 46 is still operating for the fuel elements must still be cooled. Valves 31 and 34 are shut off so that the heat exchanger 13 is barred from the reactor. The heat exchanger 13 is put under gas pressure of about 2 atmospheres gauges, so that no light water may leak out into the heat exchanger system during the following cycle in which the light water is contained in the reactor. The valves 112, 113 and 116 against the expansion system are closed and pipe 45 is barred from the heavy water system by closing the twin valve 47. If the decay heat is very low valves 108 may be opened and flushing gas is introduced into pipe 45 and the spray 46 to the reactor. The gas and the flushed out amount of heavy water passes through pipe 60 to the circulation tank 64, in which the water remains and the gas departs through pipe 109 to the expansion tank. During this period of time the cooling is insufficient and temperature in the fuel elements increases.

Valves 101 are opened and cooling light water is admitted through pipe 45. The light water washes away the rest of the heavy water and the mixture of heavy and light water thus obtained is collected in tank 64 which is shut off from the system when it has been filled and is discharged to recovering of the heavy water contained therein. Light water is now supplied until the reactor has been filled which may be calculated to take about one hour, during which the gas is allowed to leave the reactor through a vacuum tank to the chimney for example.

When the reactor has been filled with light water the concrete cupola 8 is removed, the reactor lid 2 is lifted and the core or parts of it is lifted with especial tool out of the reactor and moved away as has been described in conjunction with FIG. 1.

A new core is moved through the shaft 21, the bottom channel 20, the shaft 18 and the basin 16 and is placed in its space in the reactor 1, after which the lid 2 is put on and the concrete cupola 8 is pushed on, all these being carried out with the aid of remote operated tools, which are known per se.

In preparing the reactor for a new operation period valves 104 in pipe 103 are opened and light water is pumped out. Light water, however, is still introduced through the spray 46, but when the water surface has dropped down below the bottom of the reactor and a mixture of water and gas escapes through valves 104, valves 101 are closed.

If the decay heat is moderate, gas may be blown in through valves 103 during a period of time of about 1 minute in order to blow as much light water as possible out of the reactor and through valves 104. Then these valves 104 are closed. If the decay heat is very low the different parts of the reactor are preferably dried with an aid of circulating gas (at atmospheric pressure, preferably more) from the top part of the reactor through pipe 111 to the dryer 114 and the fan 119 and back through pipe 117 to the bottom part of the reactor. If the decay heat is substantially equal to 0, i.e. the core is new, vacuum drying may be used. On completing the drying, which may take about 3 hours, valves 118 and 120 are closed and valve 116 to the expansion system is opened.

If the decay heat is high the gas blowing is probably omitted between the spraying with light and heavy water. The heavy water spray thus washes the remainder of light water out of the reactor in a way just reversed to the procedure used at the substitution of light water for heavy water.

The reactor is now substantially free from light water. The water in the circulation tank 64 is analyzed and is being circulated by pump 49 in the way described above through the reactor after the valves 47 and 62 have been opened. After some time the water in tank 64 is again analyzed and thus information is obtained as to the effectiveness of the removal of light water. If the heavy water in the tank 64 is proved to be too much contaminated with light water, it must be replaced in a way known per se, which shall not be described in this connection. When valves 31 and 34 have been opened and valves 62, 66 have been closed, valves 55, 78 and 76 are opened, whereupon heavy water is pumped from tank 73 by pump 77 through pipe 67 to valve 55 and pipe 54 to pump 49 and hence through pipe 48 and valves 47 and via spray 46 into the reactor. When the requisite amount of heavy water has been pumped into the reactor, valves 52 for the circulation system through the spray 46 are opened. The remaining amount of heavy water in the circulation tank 64 is suitably pumped into the reactor system with the aid of the high pressure pump 86. The circulation pump 33 for the heat exchanger system is started and the reactor is ready to be started.

The gas used in flushing and drying may be any gas which is not detrimental to the heavy water, at least not in a disturbing degree. Permanent gases are preferred and nitrogen has been shown to be cheap as well as good for the purpose. The noble gases, helium for example are of course suitable but too expensive but may be contemplated for use in a closed system with compressors. Air may also be used but due to the low price of liquid nitrogen gas is preferred.

In a preferred embodiment of the invention the spray means comprises a trough-shaped partition wall 100 (see FIG. 3) horizontally arranged for collecting the heavy or light water circulated in the cooling circuit and injected into the reactor at the top part of it through nozzle 200. By several openings 400 in the partition wall 100 the water is sprayed over each of the fuel elements 300. The diameter of the openings may be about one millimeter or more. Some water may pass the partition wall and flow along the walls 500 of the reactor vessel, but this is of no consequence, since the thick wall of the reactor vessel nevertheless have to be sprayed with water during the heating and cooling down cycles at start and shut down of the reactor respectively in order to balance the temperature.

If it would be judged desirous to apply a high pressure on the water immediately in front of the openings in the partition wall 100 this may be achieved in a modification shown in FIG. 3 on the right side of the center line. The water circulating in the cooling circuit then enters the reactor through the pipe 600 with a releasable connection 700 and fixed to the partition wall at 800. The partition wall is made of an upper and a lower plate and water is introduced in the space 900 between them.

In both embodiments the openings 400 may be uniformly distributed over the partition wall. In order, however, to minimize the heavy water content in the circuit there may be more openings per unit of area in the partition wall over those parts of the core in which the decay heat is more intense. This is as a rule in the center of the core.

It is clear to the man skilled in the art that the partition wall 100 is very useful for cooling the fuel elements in emergencies.

The partition wall described will meet may other requirements. Thus it may for example be heavy in order to shield the lid of the reactor and it chokes the communication between the vapor space 1100 and the reactor core which is essential in pressurized water reactors in which the static pressure is obtained with the aid of steam or gas. It is surrounded by water at normal run of the reactor, since the heat induced therein has to be drawn off by cooling. Finally it may be pointed out that the partition wall rests upon the shield 1200 and at the same time with the blocks 1300 holding down and guiding the fuel elements 300 and that recesses 1000 are arranged at the periphery of it in order at density variations in the heavy water in the core to admit passage of heavy water.

The present invention is advantageously used in conjunction with reactors according to the U.S. patent application Serial No. 15,076 filed March 15, 1960 in the names of Bernt Torsten Allan Hargö, Dick Gilnert Dahlgren and Jöns Arthur Dahlgren, and assigned to the assignee of the present application.

Various modifications may be made in the invention without departing from the spirit or scope thereof and it is to be understood that the individual apparatus illustrated above and in the accompanying drawings are only meant to be examples for the elucidation of the invention. The main point, however, is that never before it has been regarded possible in the ordinary practice of handling the core in heavy water reactors to let out the heavy water and to replace it by light water and vice versa.

What we claim is:

1. In a process for core handling in a heavy water reactor the steps comprising: drawing-off the heavy water from the core and confining it in a first container after the reactor has been shut down, while heavy water is being sprayed over the fuel elements; then flushing the reactor core by immediately blowing a gaseous medium through the vessel and then spraying light water over the fuel elements thereby washing out the rest of the heavy water, a limited volume of the mixture of heavy water and light water thus obtained being collected and confined in a second container; filling the reactor with light water to a predetermined level after which the reactor is opened and the core is moved out of and a new core is moved into the reactor; then drawing off the light water from the core after the reactor has been closed while light water is sprayed over the fuel elements; then flushing the reactor core by immediately blowing a gaseous medium through the vessel and then spraying heavy water over the fuel elements thereby washing out the rest of the light water, a limited volume of the mixture of light water and heavy water thus obtained being collected and confined in a third container; and finally filling the reactor with heavy water to a predetermined level, after which the reactor is ready for a new running period.

2. In a process for core handling in a heavy water reactor the steps comprising: drawing-off the heavy water from the core and confining it in a first container after the reactor has been shut down, while heavy water is being sprayed over the fuel elements; then flushing the reactor core by immediately blowing a gaseous medium through the vessel and then drying the reactor with circulating gas; filling the reactor with light water to a predetermined level after which the reactor is opened and the core is moved out of and a new core is moved into the reactor; then drawing off the light water from the core after the reactor has been closed while light water is sprayed over the fuel elements; then flushing the reactor core by immediately blowing a gaseous medium through the vessel and then drying the reactor with circulating gas; and finally filling the reactor with heavy water to a predetermined level, after which the reactor is ready for a new running period.

3. In a process for core handling in a shut-down heavy water reactor the steps comprising: drawing-off the heavy water from the core and confining it in a tank while heavy water is being sprayed over the fuel elements; spraying light water over the fuel elements thereby washing out the rest of the heavy water, a mixture of heavy water and light water thus obtained being collected and confined in a container; filling the reactor with light water to a predetermined level after which the reactor is opened and at least part of the core is moved out of and a new core is moved into the reactor in the way used in light water reactors; then closing the reactor and drawing off the light water from the core while light water is sprayed over the fuel elements; spraying heavy water over the fuel elements thereby washing out the rest of the light water, a mixture of light water and heavy water thus obtained being collected and confined in said container; and finally filling the reactor with heavy water to a predetermined level, after which the reactor is ready for a new running period.

References Cited in the file of this patent

UNITED STATES PATENTS

| | | |
|---|---|---|
| 2,399,205 | Campbell | Apr. 30, 1946 |
| 2,743,225 | Ohlinger et al. | Apr. 24, 1956 |
| 2,770,591 | Wigner et al. | Nov. 13, 1956 |
| 2,848,404 | Treshow | Aug. 24, 1958 |
| 2,983,659 | Treshow | May 9, 1961 |

OTHER REFERENCES

Link et al.: "The Mighty Mouse Research Reactor Preliminary Design Study," ANL–5688, pp. 14 and 15.

"$D_2O$-Moderated Power Reactors," TID 7575, pp. 9.

Iskenderian: Int'l Conf. on the Peaceful Uses of Atomic Energy, UN publication, vol. 2, page 165 (1955).

Babcock: Second Int'l Conf. on the Peaceful Uses of Atomic Energy, UN publication, vol. 9, p. 56 (1958).

Boyd: Second Int'l Conf. on the Peaceful Uses of Atomic Energy, UN publication, vol. 10, p. 131, (1958).